Jan. 10, 1961     D. W. ORCHARD     2,967,562
DEVICE FOR LAMINATING PLASTIC SHEETS
Filed March 18, 1957     2 Sheets-Sheet 1

INVENTOR.
DAVID W. ORCHARD
ATTORNEYS

Jan. 10, 1961  D. W. ORCHARD  2,967,562
DEVICE FOR LAMINATING PLASTIC SHEETS
Filed March 18, 1957  2 Sheets-Sheet 2

INVENTOR.
DAVID W. ORCHARD
BY
ATTORNEYS

United States Patent Office 2,967,562
Patented Jan. 10, 1961

2,967,562
DEVICE FOR LAMINATING PLASTIC SHEETS

David W. Orchard, Mentor, Ohio, assignor to W. L. Gray & Company, Cleveland, Ohio, a corporation of Ohio Filed Mar. 18, 1957, Ser. No. 646,920

3 Claims. (Cl. 154—1)

This invention relates, as indicated, to a device for laminating plastic sheets.

It has heretofore been common practice to enclose photographs, cards, etc., between two transparent plastic sheets, which serve to protect the photograph or card against damage or injury. For this purpose the photograph or card is inserted between the two transparent plastic sheets, at least one of which is provided on its inner surface with a pressure sensitive adhesive, and the assembly is then run between two rubber pressure rolls, which cause the parts to adhere together.

In devices which have heretofore been used for this purpose, the reluctance or resistance of the upper roll to rotation against the upper plastic sheet of the assembly, while the driving force of the lower roll against the lower plastic sheet of the assembly moves this lower sheet forwardly, causes the assembled sheets and photograph or card to assume a curl or curvature which is objectionable not only from the standpoint of appearance but also from that of placing the card in a wallet or other carrier or in removing it therefrom.

The present invention has as its primary object the provision of a device of this character which will insure that the assembled plastic sheets and photograph or card will emerge from the rolls in a flat unaltered condition, and free from any tendency to become curled or curved.

Another object of the invention is to provide a device of the character described having a novel assemblage of pressure rolls and springs for producing a predetermined fixed pressure between the pressure rolls.

A further object of the invention is to provide a device of the character described having novel spring-mounting means.

A still further object of the invention is to provide a device of the character described, having a novel guard for protecting the fingers of a person trimming the assembled sheets and photograph from injury during the trimming operation.

Other objects and advantages of my invention will be apparent during the course of the following description.

In the accompanying drawings forming a part of this specification, and in which like numerals are employed to designate like parts throughout the same, Fig. 1 is a fragmentary top plan view of the device;

Figure 1:
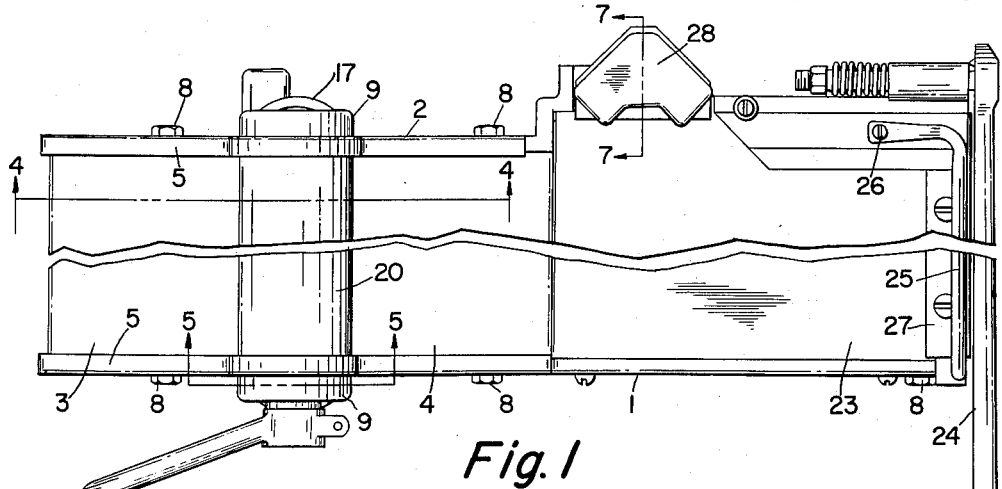

Referring more particularly to the drawings, the device will be seen to comprise front and rear frame members, 1 and 2 respectively, which are preferably in the form of aluminum castings, and which, except for slight differences in certain details, are alike in general appearance and construction.

The frame members 1 and 2 have disposed therebetween an entrance table 3 and an exit table 4, which are secured between flanges 5 of the frame members and lugs 6 extending inwardly from the frame members. These frame members also have disposed therebetween a lower shelf member 6a, which is secured between lugs 6b and 6c extending inwardly from the frame members. The frame members, tables, and shelf are maintained in assembled relationship by means of tie-rods 7 and nuts 8 secured to the ends of the tie-rods, and the entire assembly is thus of boxlike form, producing a desired stability for the device.

The frame members 1 and 2 are molded or formed to provide housings 9, for ball-bearings 10, in which the ends 11 of rollers 12 and 13 are mounted. The rollers 12 and 13 are preferably formed of 1018 cold-rolled steel, and are covered with coverings 14, preferably made of a synthetic rubber, such for example, as Neoprene SC 915, the coverings being rigidly bonded or otherwise permanently secured to the rollers.

Figure 2:
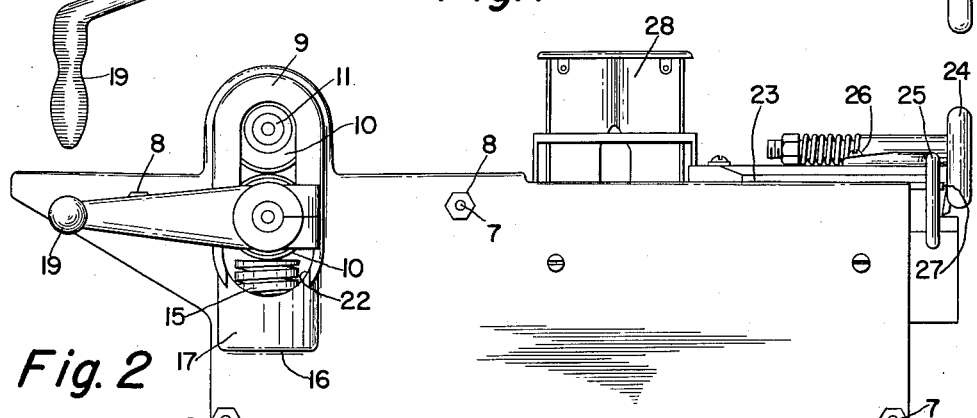
Fig. 2 is a front elevational view of the device.
Figure 3:
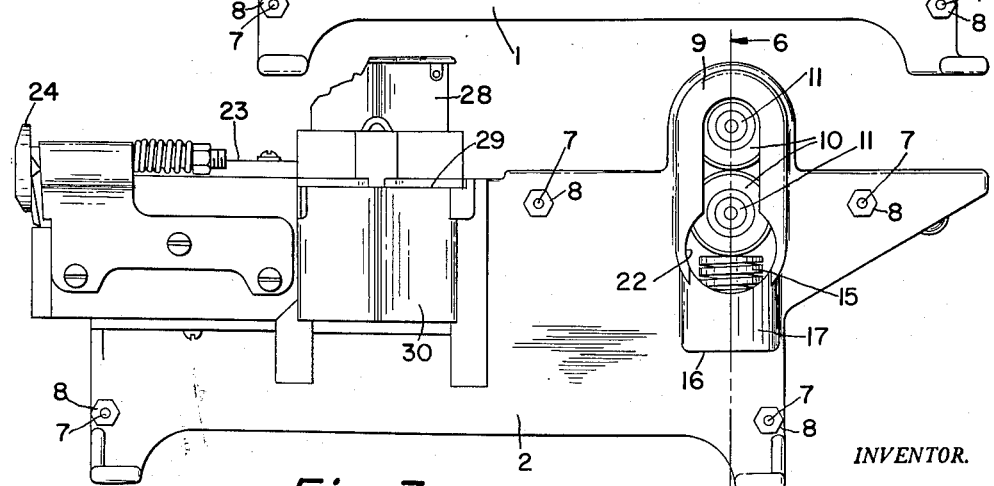
Fig. 3 is a rear elevational view of the device.
Figure 4:
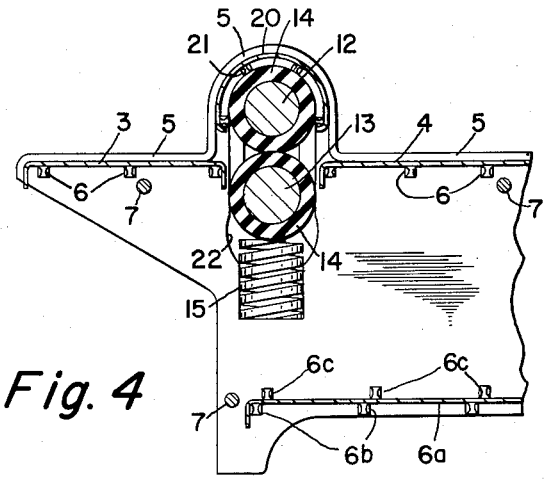
Fig. 4 is a fragmentary cross-sectional view, taken on the line 4—4 of Fig. 1.

The ball-bearings 10 are maintained in the housing 9 by means of compression coil springs 15, the upper ends of these springs supporting the lower bearings 10, and the lower ends of the springs resting on perches 16 formed integrally with the frame members 1 and 2, as clearly shown in Figs. 2, 3 and 4. The perches 16 are formed as at 17 to encircle or enclose portions of the springs 15.

One end of the roller 13 is extended, as at 18, for the connection thereto of a crank handle 19, by means of which the roller 13 is rotated, the rotation of this roller being frictionally imparted to the roller 12.

A curved hood 20 is provided for the roller 12, this hood, as shown in Fig. 4, being rigidly secured in position between the flanges 5 of the frame members 1 and 2 and lugs 21 extending inwardly from these frame members. This hood protects the upper roller against access of dust and also prevents accidental insertion of fingers between the rolls.

Figure 5:
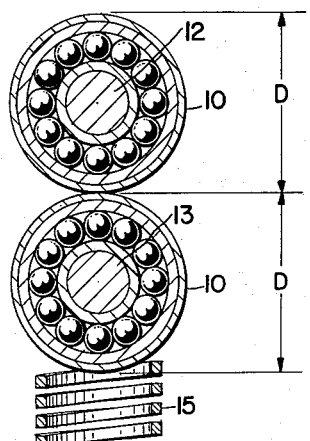
Fig. 5 is a fragmentary cross-sectional view, approximately full scale, taken on the line 5—5 of Fig. 1.

An important feature of the invention resides in the fact that the outer diameter D of the ball bearings or ball-bearing units 10, as shown in Fig. 5, is substantially the same as the outer diameter of the roller coverings 14. This results in a number of advantages, as follows:

(a) The ball bearings of the upper and lower rollers are in constant engagement with each other, the pressure therebetween being maintained at a constant or fixed value, which is that resulting from the pressure of the springs 15. This pressure may be relatively low, so that no undue stresses are imparted to these ball bearings, which might tend to distort or damage them, although the pressure could be as much as 20 times the imposed value, without damage to the bearings.

(b) Since the outer diameters of the coverings 14 are no greater than the outer diameters D of the ball-bearings 10, the pressure of the springs 15 is not communicated to these coverings, so that the coverings of the upper and lower rollers are virtually free of pressure engagement with each other, when the device is not in use. This is a distinct advantage, since the coverings, in this way, are not compressed or distorted, except when used, and their life is greatly increased. Moreover, the coverings are not subjected to certain setting tendencies, commonly known as compression set.

(c) When the assembly of plastic sheets and photograph or card is run through the rollers, in order to laminate these to each other, the pressure created between the rollers by virtue of such passage is sufficient to cause the upper roller to rotate in response to rotation of the handle 19. At the same time, the reduced friction of the mountings allows the upper roll to turn freely. As a result, the upper and lower plastic sheets of the assembly are pushed through the rollers at the same speed, and there is no tendency of the assembly to become curled or curved in its passage through the rollers. The assembly emerges from the rolls in as flat a condition as it entered the rolls. In spite of this pressure, no permanent distortion or compression of the rubber coverings can occur to such coverings during use of the device. The resiliency of the coverings will permit the passage of thick material without damage.

The entrance table 3, as well as the exit table 4, are disposed at a level which is substantially that of the roll pass, so that the parts to be laminated may be quickly and easily assembled on the entrance table, passed through the rolls, and quickly and easily transferred to the exit table for further operations to be presently described.

It will be noted that the housings are provided with circular openings 22 (Figs. 2, 3, 4 and 6), which are of a diameter slightly larger than the outside diameter of the ball bearings and roll coverings. These openings facilitate assembly of the rollers in the device, as well as removal of the rollers for repair or replacement purposes.

Figure 6:
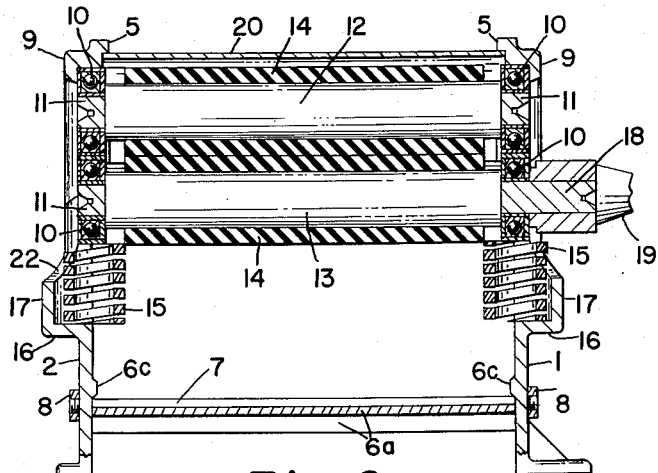
Fig. 6 is a cross-sectional view, taken on the line 6—6 of Fig. 3.
Figure 7:
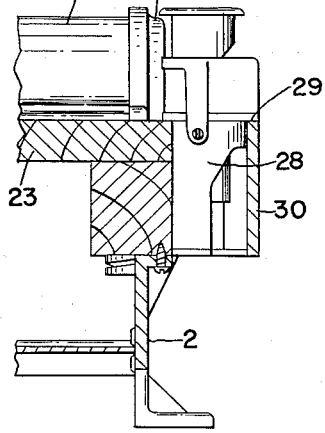
Fig. 7 is a fragmentary cross-sectional view, taken on the line 7—7 of Fig. 1.

In assembling the rollers, the upper roller may be inserted endwise into the device through either of the openings 22, and the ball bearings of said roller positioned in the housings 9. The upper roller is then moved upwardly to its operative position, and the lower roller then inserted endwise through one of the openings 22 to a position below the upper roller. The springs 15 may then be pushed into the housings 9 from the interior of the device, and positioned so as to seat on the perches 16 as shown in Fig. 6. The removal of the springs and rollers is effected by a reversal of these steps.

The device also includes a cutter or trimmer 23 of conventional design, which is mounted on the device, in tandem with the rollers, and is provided with a movable cutter blade 24. This cutter or trimmer is utilized for cutting or trimming the sides or edges of the laminated assembly of plastic sheets and photograph or card. In the present device, an improvement has been provided, in the form of a guard 25, formed of wire or rod, which is secured to the cutter, as by a screw 26. This guard is disposed adjacent and parallel to the cutting edge of the stationary cutting blade 27 of the cutter, and serves to prevent the fingers of the person trimming the assembly from entering the space between the blades 24 and 27.

The device further includes a trimmer 28, which is mounted on the device, and which rests on a ledge 29, formed by a housing 30, which encloses the trimmer 28, and is an integral part of the frame member 2. This trimmer 28 is used for trimming or rounding the corners of the laminated assembly, and may be of the type disclosed in the Anderson Patent No. 2,082,867.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

For example, the same results could be obtained by a gear drive between the two rolls, but this would be considerably more expensive than the arrangement described.

Moreover, the springs might be positioned above the bearings of the upper rollers.

Having thus described my invention, I claim:

1. In a machine for laminating plastic sheets by rolling, a frame structure comprising spaced frame members each having thereon a perch and a hollow bearing housing providing a guideway extending away from the perch in a substantially aligned relation therewith, the perches and bearing housings of said frame members being in a substantially opposed relation transversely of said frame structure, means on said housings providing closed ends for the guideways at the ends of said guideways remote from said perches, antifriction bearings in said guideways, rollers extending transversely of said frame structure and rotatably supported by said bearings with peripheral portions of the rollers in co-operating relation, the bearings supporting one roller being in engagement with said closed ends and the bearings supporting the co-operating roller being in a radially engaged relation with the bearings supporting said one roller, coil springs seated on said perches and expansively effective against the bearings supporting said co-operating roller, and driving means connected with at least one of said rollers for imparting rotary movement thereto, the bearing housing of at least one of said frame members having an opening in a side wall thereof and communicating with the guideway thereof at a point between the associated perch and closed end and said opening being of a size for endwise axial movement of said rollers and bearings therethrough to assembled positions in said frame structure.

2. A machine as defined in claim 1 wherein said rollers comprise two rollers having resilient peripheral coverings thereon and wherein the bearings supporting said rollers are peripherally circular in shape and in direct radial thrust engagement with each other, the outer diameter of said bearings being at least as great as the outer diameter of said coverings.

3. In a machine for laminating plastic sheets by rolling, a frame structure comprising spaced frame members each having thereon a perch and a hollow bearing housing providing a guideway extending away from the perch in a substantially aligned relation therewith, the perches and bearing housings of said frame members being in a substantially opposed relation transversely of said frame structure, means on said housings providing closed ends for the guideways at the ends of said guideways remote from said perches, a pair of antifriction bearings of a peripherally circular shape in each guideway and one bearing of each guideway being in engagement with one of said closed ends, a pair of rollers extending transversely of said frame structure and rotatably supported by said bearings to form a pass for material to be rolled, the bearings of each guideway having their peripheries in direct radial engagement in a common plane extending through the rotation axes of said rollers, cylindrical resilient coverings on said rollers, said resilient coverings and the circular peripheries of said bearings being of substantially the same external diameter, coil springs seated on said perches and being in a direct and expansively effective engagement with the other bearings of said guideways, driving means connected with at least one of said rollers for imparting rotation thereto, said housings being open on their adjacent sides and at least one housing having an entry opening on the outer lateral side thereof and communicating with the associated guideway at a point between the associated perch and closed end, said entry opening being of a size and shape for endwise axial movement of said rollers and bearings therethrough to assembled positions in said frame structure, entrance and exit tables supported by said frame structure in a substantially horizontal coplanar relation with said pass, and a hood supported by said frame structure and extending transversely thereof between said housings, said hood having a curved portion extending in covering relation to one of said rollers and also having side edges extending to points adjacent said tables.

References Cited in the file of this patent

UNITED STATES PATENTS

| | | |
|---|---|---|
| 746,963 | Hooker | Dec. 15, 1903 |
| 763,895 | Holmes | June 24, 1904 |
| 1,059,879 | Kennedy | Apr. 22, 1913 |
| 1,852,451 | Everett | Apr. 5, 1932 |
| 1,972,536 | Rohrdanz | Sept. 4, 1934 |
| 2,302,566 | Minkow | Nov. 17, 1942 |
| 2,611,720 | Van Dyck et al. | Sept. 23, 1952 |
| 2,635,973 | Swindler | Apr. 21, 1953 |
| 2,776,510 | Klopfenstein | Jan. 8, 1957 |